Nov. 26, 1968
H. F. KJERULF ET AL
3,412,412
AIRCRAFT LOADING AND UNLOADING RAMP WITH
PIVOTABLE OUTER PASSAGEWAY
Filed Jan. 27, 1966
2 Sheets-Sheet 1
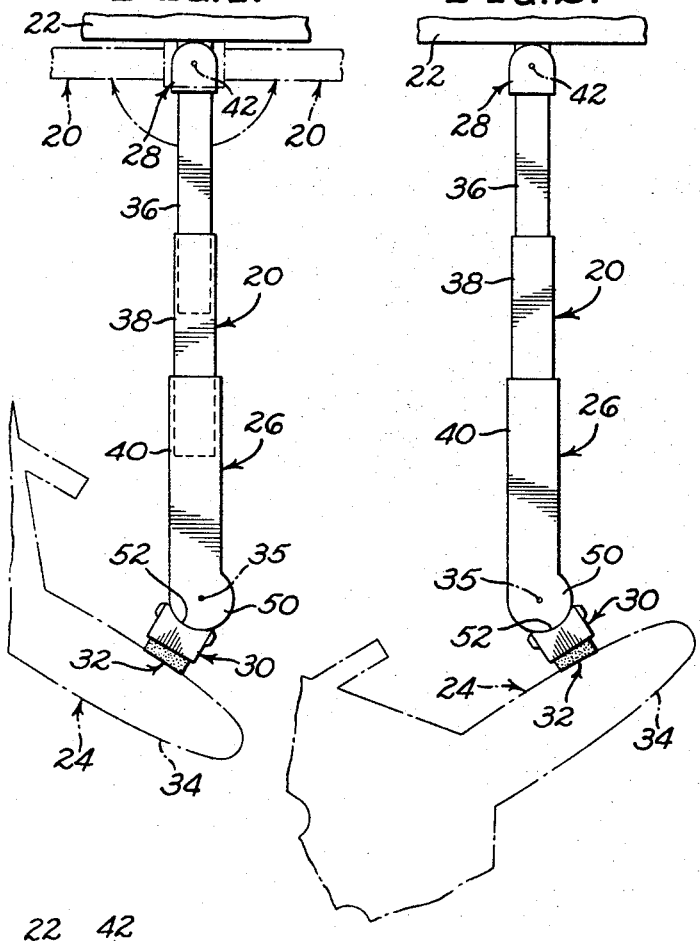
INVENTORS.
HANS F. KJERULF
HARRY L. WARNER
BY THEIR ATTORNEYS.
HARRIS, KIECH, RUSSELL & KERN

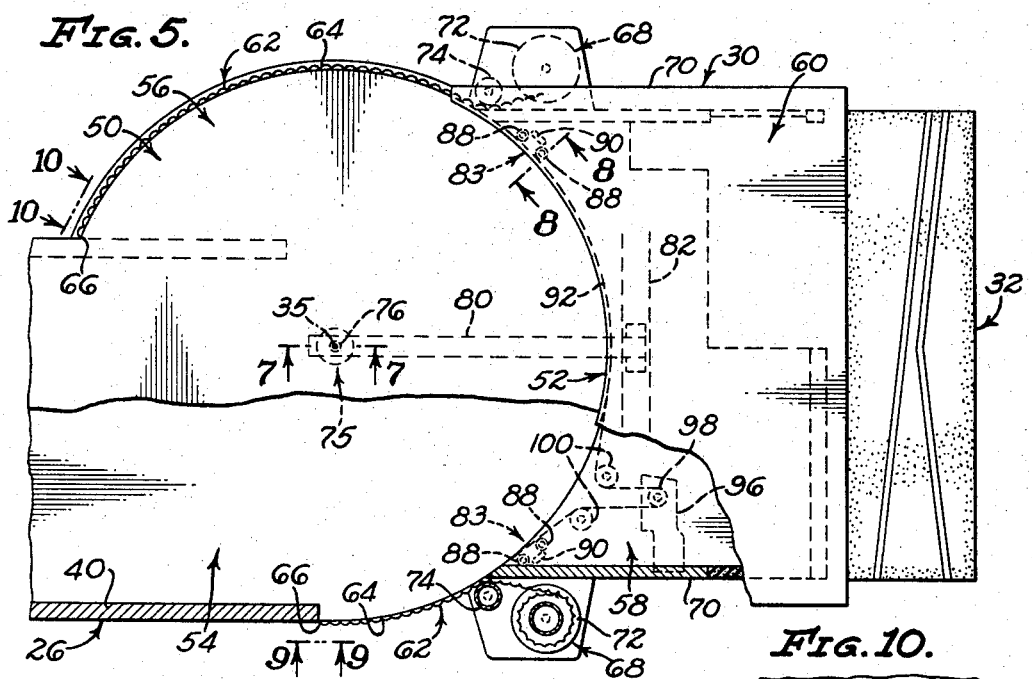
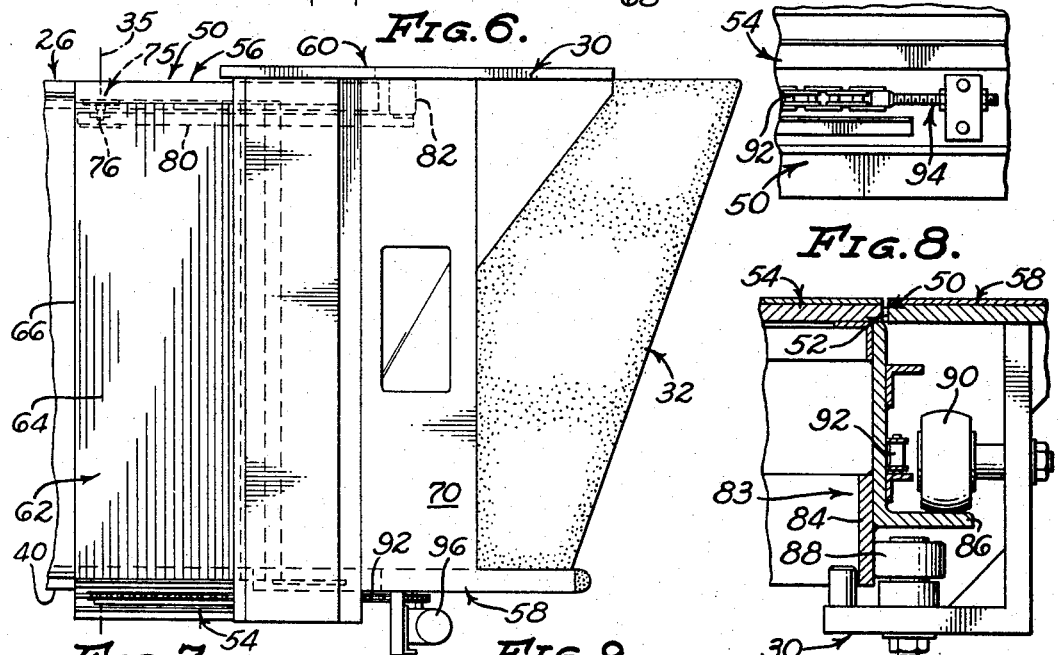
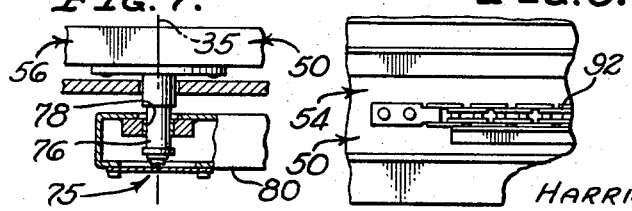

United States Patent Office 3,412,412
Patented Nov. 26, 1968

3,412,412
AIRCRAFT LOADING AND UNLOADING RAMP
WITH PIVOTABLE OUTER PASSAGEWAY
Hans F. Kjerulf, Los Angeles, and Harry L. Warner, West
Covina, Calif., assignors to Stanray Corporation, Chicago, Ill., a corporation of Delaware
Filed Jan. 27, 1966, Ser. No. 523,455
10 Claims. (Cl. 14—71)

ABSTRACT OF THE DISCLOSURE

A passenger loading and unloading ramp for airplanes which includes an arcuate, convex outer end having an angular extent of more than 180° and having a diameter greater than the width of the portion of the ramp lying between the outer and inner ends thereof, and which further includes an outer cab having an arcuate, concave surface of a smaller angular extent than and movable along the arcuate, convex outer end of the ramp, whereby the outer cab is pivotable or rotatable relative to the arcuate, convex outer end of the ramp through a large angle, e.g., 100° or more.

Background of invention

The present invention relates in general to a ramp for loading and unloading vehicles and will be considered herein as a passenger loading and unloading ramp for airplanes as a matter of convenience, although the invention is susceptible of other applications.

In general, the invention contemplates a loading and unloading ramp capable of providing an enclosed passageway between an airport terminal building, walkway, or the like, and a doorway in an airplane to be loaded or unloaded. More particularly, the invention contemplates a ramp having an inner end in communication with an airport terminal building, walkway, or the like, and having an outer end engageable with the fuselage of the airplane around the doorway therein.

Still more specifically, the invention contemplates an articulated ramp which includes: an inner passageway having an inner end in communication with the airport terminal building, walkway, or the like, and having an outer end; an outer passageway having an outer end engageable with the fuselage of the airplane around the doorway therein and having an inner end in communication with the outer end of the inner passageway; and means connecting the outer passageway to the inner passageway for pivotal movement of the outer passageway relative to the inner passageway about a generally vertical axis. With a ramp of this type the outer passageway can be pivoted relative to the inner passageway to bring the outer end of the outer passageway into proper engagement with the fuselages of airplanes parked at various angles relative to the airport terminal building, walkway, or the like, with which the ramp is used.

Summary and objects of invention

The primary object of the present invention is to provide a loading and unloading ramp of the foregoing type wherein the outer passageway is carried by the inner and comprises a relatively small and lightweight cab requiring only relatively small and lightweight pivot means for pivotally connecting it to the outer end of the inner passageway. A related object is to provide an outer cab of this nature which is pivotable relative to the inner passageway through a large angle to accommodate a wide range of airplane parking angles.

Considering the invention more specifically, an important object thereof is to provide a loading and unloading ramp wherein the inner passageway is provided with an arcuate, convex outer end, and wherein the outer cab is provided with an arcuate, concave inner end complementary to and movable along the convex outer end of the inner passageway to pivot the outer cab about the common axis of the convex outer end of the inner passageway and the concave inner end of the outer cab, which common axis is substantially vertical.

Since the inner passageway includes an arcuate, convex outer end along which the outer cab is circumferentially movable, the outer cab is a relatively small and lightweight component requiring only relatively small and lightweight pivotal connections to the inner passageway, which is an important feature of the invention.

Another object of the invention is to provide means for pivotally connecting the outer cab to the inner passageway which includes interengageable pivot elements on the inner passageway and the outer cab for pivotally connecting the top of the outer cab to the top of the inner passageway, and which includes interengageable, arcuate track means and track follower means on the inner passageway and the outer cab for pivotally connecting the bottom of the outer cab to the bottom of the inner passageway. A related object is to provide a construction wherein the track means includes generally vertical and generally horizontal arcuate tracks and wherein the track follower means includes generally horizontal and generally vertical rollers or wheels respectively engaging the generally vertical and generally horizontal tracks. With this construction, the generally vertical wheels engaging the generally horizontal track act to support the weight of the outer cab, while the generally vertical track and the generally horizontal wheels act to pivotally connect the bottom of the outer cab to the bottom of the inner passageway.

Another object is to provide driving means carried by the outer cab and engageable with driven means carried by the inner passageway for moving the concave inner end of the outer cab generally horizontally along the convex outer end of the inner passageway about the common, generally vertical, axis of such arcuate passageway ends.

A further object of the invention is to provide a ramp having the foregoing features wherein the angular extent of the concave inner end of the outer cab is less than that of the convex outer end of the inner passageway, and to provide the ramp with curtain means connected to the outer cab and the inner passageway for continuously covering any portions of the convex outer end of the inner passageway which are not covered by the concave inner end of the outer cab. With this construction, the junction between the inner passageway and the outer cab is maintained weatherproof at all times.

Still another object is to provide a ramp wherein the foregoing curtain means includes two curtains extending along the convex outer end of the inner passageway, and reel means for winding up and unwinding the curtains as the outer cab is pivoted relative to the inner passageway.

Still another object of the invention is to incorporate the foregoing features of the invention in a loading and unloading ramp having an inner passageway capable of being pivoted or swung generally horizontally about a generally vertical pivot axis at the inner end of the inner passageway. Another object in this connection is to provide means for raising and lowering the outer end of the inner passageway. With this construction, a wide variety of airplane positions can be accommodated by varying the angular horizontal position of the inner passageway relative to the airport terminal building, walkway, or the like, and by varying the horizontal angular position of the outer cab relative to the inner passageway.

Also, the outer cab may be raised and lowered to accommodate airplane doorways at different levels above the ground.

Still another object is to incorporate features of the foregoing nature in a loading and unloading ramp wherein the inner passageway includes telescopically interconnected sections, and wherein the outermost section of the inner passageway is supported by steerable means for swinging the ramp generally horizontally and/or for extending or contracting all of the telescopically interconnected sections of the inner passageway relative to each other, such steerable supporting means incorporating means for raising and lowering the outer end of the inner passageway. With this construction, the outer end of the outer cab can be maneuvered into position to accommodate doorways of airplanes parked in a wide variety of positions relative to the airport terminal building, walkway, or the like, with which the ramp of the invention is used.

The foregoing objects, advantages, features and results of the present invention, together with various other objects, advantages, features and results thereof which will be evident to those skilled in the loading and unloading ramp art in the light of this disclosure, may be achieved with the exemplary embodiment of the invention described in detail hereinafter and illustrated in the accompanying drawings.

*Description of drawings*

In the drawings:

FIGS. 1, 2 and 3 are semidiagrammatic plan views illustrating a loading and unloading ramp of the invention in engagement with airplanes parked at widely-varying angles relative to an airport terminal building, walkway, or the like;

FIG. 4 is an enlarged side elevational view of the ramp of the invention;

FIG. 5 is an enlarged view, partially in plan and partially in horizontal section, of the outer end of the ramp of the invention;

FIG. 6 is an enlarged side elevational view of the outer end of the ramp of the invention;

FIGS. 7 and 8 are enlarged, fragmentary, sectional views respectively taken along the arrowed lines 7—7 and 8—8 of FIG. 5; and FIGS. 9 and 10 are enlarged, fragmentary, elevational views respectively taken as indicated by the arrowed lines 9—9 and 10—10 of FIG. 5 of the drawings.

*Description of preferred embodiment of invention*

Referring initially to FIGS. 1 to 4 of the drawings, the loading and unloading ramp of the invention is designated generally therein by the numeral 20 and is shown in use to transfer passengers between an airport terminal building 22, or the like, and an airplane 24, the latter being shown in FIGS. 1 to 4 as parked in different positions relative to the building.

More particularly, the ramp 20 includes an inner passageway 26 having an inner end 28 in communication with a doorway, not shown, in the building 22, and includes an outer passageway or cab 30 having an outer end 32 engageable with the fuselage 34 of the airplane 24 around a doorway, not shown, therein. The outer cab 30 is pivotable relative to the inner passageway 26 about a generally vertical axis 35 in accordance with the invention, in a manner to be described in detail hereinafter. The outer cab 30 is pivotable relative to the inner passageway 26 through a large angle, preferably in excess of 100°, to accommodate a wide variety of angular positions of the airplane 24 relative to the building 22, as shown in FIGS. 1 to 4 of the drawings.

In the particular embodiment of the invention illustrated in the drawings, the inner passageway 26 of the ramp 20 is of the general type disclosed in Patent No. 3,184,772, granted May 25, 1965 to Herbert Carvel Moore and Carl L. Lodjic. More particularly, the inner passageway 26 comprises telescopically interconnected innermost, intermediate and outermost sections 40 which render the inner passageway 26 capable of longitudinal extension and contracton to accommodate airplane positions located different distances from the doorway in the building 22. Also, the entire inner passageway 26 is horizontally swingable, about a generally vertical axis 42 at the inner end 28 of the passageway 26, to permit the ramp 20 to accommodate airplane positions along different radial lines from the doorway in the building 22. When the ramp 20 is not in use, the inner passageway 26 may be fully contracted and swung into a position alongside the building 22, as shown in broken lines in FIG. 1.

Referring to FIG. 4 of the drawings, the ramp 20 includes means 44 connected to the innermost section 36 of the inner passageway 26 for supporting the inner end 28 of such passageway for generally horizontal swinging movement of the entire ramp 20 about the generally vertical pivot axis 42. The ramp 20 also includes steerable, self-propelled, supporting means 46 connected to the outermost section 40 of the inner passageway 26. By suitably maneuvering the supporting means 46, the telescoping sections 36, 38 and 40 of the inner passageway 26 can be extended or contracted, and/or the outer end 32 of the outer cab 30 can be swung horizontally about the pivot axis 42 (in addition to pivoting relative to the inner passageway 26 about the axis 35) to accommodate a wide variety of airplane locations relative to the building 22. Additionally, the supporting means 46 includes means 48 for raising and lowering the outer end 32 of the outer cab 30 to accommodate airplane doorways at different levels.

The foregoing general construction and mode of operation of the ramp 20 of the invention are disclosed in the aforementioned Moore-Lodjic patent, attention being directed thereto for a more detailed disclosure. The present invention relates to the structural relationship between the outer cab 30 and the inner passageway 26, and will now be considered in more detail.

As best shown in FIGS. 1 to 3 and 5 of the drawings, the inner passageway 26 is provided, at the outer end of the outermost telescoping section 40 thereof, with an arcuate, convex outer end 50. The outer cab 30 is provided with an arcuate, concave inner end 52 which is complementary to the convex outer end 50 of the inner passageway 26. The arcuate outer and inner ends 50 and 52 of the inner and outer passageway 26 and 30 are oriented generally vertically and have the pivot axis 35 of the outer passageway 30 as their common axis. As will be described in more detail hereinafter, the concave inner end 52 of the outer passageway or cab 30 is movable generally horizontally along the convex outer end 50 of the inner passageway 26 so as to pivot the outer cab generally horizontally relative to the inner passageway about the pivot axis 35. As hereinbefore indicated, the angle through which the outer cab 30 is pivotable relative to the inner passageway 26 is large, preferably exceeding 100°, to accommodate a wide range of airplane angles relative to the building 22, as clearly shown in FIGS. 1 to 3 of the drawings.

Since the inner passageway 26 is provided with the arcuate, convex outer end 50 relative to which the arcuate, concave inner end 52 of the outer cab 30 is horizontally swingable about the pivot axis 35, the outer cab 30 may be a relatively small and lightweight component. Consequently, it is unnecessary to provide any massive pivots, or the like, for connecting the outer cab 30 to the inner passageway 26, as compared, for example, to a ramp wherein the entire outer end of the inner passageway is pivotable about a generally vertical axis. In such a case, the pivoted component is a large and heavy one requiring large and heavy pivots, or other large and heavy supporting means. Nothing of this nature is required by the small and lightweight outer cab 30 resulting from providing the inner passageway 26 with the convex outer end 50.

Considering the relationship between the inner passageway 26 and the outer cab 30 in more detail, the convex outer end 50 of the inner passageway includes an arcuate, convex floor 54 and roof 56. The outer cab 30 includes a floor 58 the inner end of which constitutes part of the arcuate, concave inner end 52 of the cab, and which is flush with the floor 54 of the arcuate, convex outer end 50 of the inner passageway 26, as best shown in FIG. 8. The outer cab 30 includes a roof 60 having an arcuate, concave inner end constituting part of the arcuate, concave inner end 52 of the outer cab 30. The arcuate, concave inner end of the roof 60 of the outer cab 30 overlies and slightly overlaps the arcuate, convex roof 56 of the outer end 50 of the inner passageway 26. This permits a weathertight seal, not shown, between the roofs 56 and 60.

It will be noted that the angular extent of the concave inner end 52 of the outer cab 30 is less than that of the convex outer end 50 of the inner passageway 26, this relationship being necessary to permit pivoting of the outer cab 30 relative to the inner passageway 26 about the pivot axis 35 through the desired large angle. The ramp 20 includes side curtain means, designated generally by the numeral 62, for continuously covering any side portions of the convex outer end 50 of the inner passageway 26, between the floor 54 and the roof 56, which are not covered by the concave inner end 52 of the outer cab 30. More particularly, the curtain means 62 includes two side curtains 64 extending circumferentially of the convex outer end 50 of the inner passageway 26, and extending vertically between the floor and roof 54 and 56 thereof. Each of the curtains 64 is attached to the outer section 40 of the inner passageway 26 along a generally vertical line 66 at the junction of the convex outer end 50 with the outer section 40 of the inner passageway 26. The other end of each curtain 64 is connected to reel means 68 mounted on a corresponding side wall 70 of the outer cab 30. Each such reel means 68 includes a reel 72 and an idler roll 74 for guiding the corresponding side curtain 64 onto and off the corresponding reel. The constructions of the two reel means 68 are such that they automatically wind up and unwind the side curtains 64 as required in response to horizontal swinging movement of the outer cab 30 relative to the inner passageway 26, thereby continuously covering those side portions of the convex outer end 50 of the inner passageway 26 which are not covered by the concave inner end 52 of the outer cab 30. Reel means capable of performing this function are well known in the art so that a further description of the reel means 68 is not necesasry.

The outer cab 30 is connected to the convex outer end 50 of the inner passageway 26 by a pivot means which includes interengageable pivot elements, generally designated by the numeral 75, connected to the roofs 56 and 60 of the passageway end 50 and the outer cab 30, and which includes interengageable, arcuate track means and track follower means, designated generally by the numeral 83, carried by the floors 54 and 58 of the passageway end 50 and the outer cab 30.

Considering the pivot elements 75 which pivotally interconnect the roof 56 of the passageway end 50 and the roof 60 of the outer cab 30, and referring particularly to FIGS. 5, 6 and 7 of the drawings, the roof 56 of the passageway end 50 is provided with a depending pivot pin 76 the axis of which coincides with the pivot axis 35. The pivot pin 76 extends downwardly into and is journalled in a pivot socket 78 carried by one end of a beam 80 the other end of which is connected to a frame member 82 forming part of the structure of the roof 60 of the outer cab 30.

Considering the interengageable track means and track follower means 83 on the floors 54 and 58 of the passageway end 50 and the outer cab 30, and referring particularly to FIGS. 5 and 8 of the drawings, the structure of the floor 54 of the passageway end 50 carries arcuate, convex, generally vertical and generally horizontal tracks 84 and 86 circumferentially coextensive with the passageway end 50. The structure of the floor 58 of the outer cab 30 carries generally horizontal and generally vertical rollers or wheels 88 and 90 respectively engaging the tracks 84 and 86. The vertical wheels 90 engage the horizontal track 86 to support the weight of the outer cab 30, while the horizontal wheels 88 engage the vertical track 84 to supplement the action of the pivot elements 75 in pivotally connecting the outer cab 30 to the passageway end 50. More particularly, the pivot pin and socket 76 and 78 and the track and wheels 84 and 88 resist the couple produced by the overhanging weight of the outer cab 30.

Because of the relatively small size and light weight of the outer cab 30, as compared to a structure wherein the entire outer end of the inner passageway 26 is pivotable, the foregoing pivot means provided by the pivot elements 76 and 78, the tracks 84 and 86, and the wheels 88 and 90, may also be relatively small and light in weight. As will be apparent, this is the result of providing the inner passageway 26 with the stationary, convex outer end 50.

For the purpose of pivoting the outer cab 30 relative to the convex outer end 50 of the inner passageway 26 about the pivot axis 35, the ramp 20 is provided with interengageable driving means on the passageway end 50 and the outer cab 30. More particularly, extending circumferentially of the supporting structure of the arcuate, convex floor 54 of the passage 50 is a chain 92 the ends of which are anchored to the floor structure in the manners respectively shown in FIGS. 9 and 10. It will be noted that the anchor for the end of the chain 92 which is shown in FIG. 10 includes adjustment means 94 for adjusting the slack in the chain.

Carried by the floor 58 of the outer cab 30 is a reversible drive motor 96 having a drive sprocket 98 around which the chain 92 is trained, the chain also being trained around idler sprockets 100 between the drive sprocket 98 and the convex edge of the floor 54.

As will be apparent, the motor 96 drives the sprocket 98 in one direction or the other to swing the outer cab 30 in one direction or the other, relative to the outer end 50 of the inner passageway 26, as required to properly position the outer end 32 of the cab 30 around a doorway in the fuselage 34 of the airplane 24. As the outer cab 30 is swung in this manner, the respective side curtains 64 are wound up and unwound as required to continuously cover those side portions of the convex outer end 50 of the inner passageway 26 which are not covered by the concave inner end 52 of the outer cab. Because the present invention permits an outer cab 30 of relatively light weight, a relatively small drive motor 96 swings the outer cab into its proper angular position quickly and easily.

Although an exemplary embodiment of the invention has been disclosed herein for purposes of illustration, it will be understood that various changes, modifications and substitutions may be incorporated in such embodiment without departing from the spirit of the invention as defined by the claims which follow.

We claim:
1. In a vehicle loading and unloading ramp, the combination of:
  (a) a generally horizontal inner passageway having an inner end and having an enlarged generally vertical, arcuate, convex outer end the diameter of which is greater than the width of the portion of said inner passageway thereadjacent and the angular extent of which exceeds 180°;
  (b) a generally horizontal outer passageway having a generally vertical, arcuate, concave inner end which is complementary to and movable generally horizontally along said convex outer end of said inner passageway and which has an angular extent that is small as compared to said angular extent of said convex outer end of said inner passageway, and said outer passageway having an outer end engageable with a vehicle to be loaded or unloaded;

(c) said concave inner end of said outer passageway and said convex outer end of said inner passageway having a common, generally vertical axis;

(d) means mounting said outer passageway on said inner passageway for movement of said concave inner end of said outer passageway generally horizontally along said convex outer end of said inner passageway about said common axis; and (e) whereby said outer passageway is pivotable generally horizontally relative to said inner passageway about said common axis and through a large angle; and (f) said convex outer end of said inner passageway being laterally offset relative to the portion of said inner passageway thereadjacent and being tangent at one end to one side of the portion of said inner passageway thereadjacent.

2. A vehicle loading and unloading ramp as set forth in claim 1 wherein said mounting means includes interengageable, arcuate track means and track follower means respectively carried by said passageways adjacent and extending along said arcuate ends thereof.

3. A vehicle loading and unloading ramp as set forth in claim 1 wherein said mounting means includes upper interengageable pivot elements respectively carried by said passageways on said common axis, and includes lower interengageable, arcuate track means and track follower means respectively carried by said passageways adjacent and extending along said arcuate ends thereof.

4. A vehicle loading and unloading ramp as set forth in claim 3 wherein said track means includes generally vertical and generally horizontal tracks and wherein said track follower means includes generally horizontal and generally vertical wheels respectively engaging said generally vertical and generally horizontal tracks.

5. In a vehicle loading and unloading ramp, the combination of:

(a) means defining a first passageway having vertically spaced upper and lower walls, one end of each of said walls being arcuately convex about a vertical axis;

(b) means defining a second passageway having vertically spaced upper and lower walls generally horizontally aligned with corresponding walls of said first passageway, each having an end arcuately concave about said axis and generally mating with said corresponding convex ends;

(c) cooperating arcuate track and roller means on said bottom walls, respectively, for vertically supporting said second passageway on said first passageway and for guiding said second passageway for arcuate movement about said axis; and, (d) a tension member secured at one end to said upper wall of said second passageway and journalled at its other end to said upper wall of said first passageway, about said vertical axis.

6. A ramp as defined in claim 5 wherein said track means includes generally vertical and generally horizontal tracks and wherein said roller means comprise generally horizontal and generally vertical wheels respectively engaging said horizontal and vertical tracks.

7. A ramp as defined in claim 5 wherein said tension member comprises an elongated member extending under said upper wall of said first passageway, to said axis.

8. A ramp as defined in claim 5 including interengaging drive means on said first and second passageways for swinging said second passageway about said axis.

9. A ramp as defined in claim 5 wherein the angular extent of said concave end is less than that of said convex end; and curtain means connected to said passageways to cover portions of said convex end not covered by said concave end.

10. A ramp as defined in claim 9 wherein said curtain means includes:

two curtains extending along said convex end and connected to one of said passageways; and reel means carried by the other of said passageways for winding up and unwinding said curtains as said second passageway is pivoted relative to said first passageway about said axis.

References Cited

UNITED STATES PATENTS

| 2,875,457 | 3/1959 | Read et al. | 14—71 |
| 3,184,772 | 5/1965 | Moore et al. | 14—71 |
| 3,060,471 | 10/1962 | Yuen | 14—71 |
| 3,263,254 | 8/1966 | Wollard et al. | 14—71 |

FOREIGN PATENTS

| 660,225 | 3/1963 | Canada. |

OTHER REFERENCES

Wollard Aircraft Service Equipment of Miami, Florida, pages 11 and 12, printed 1965.

JACOB L. NACKENOFF, *Primary Examiner.*